(12) United States Patent
Bloesch et al.

(10) Patent No.: US 12,118,668 B2
(45) Date of Patent: Oct. 15, 2024

(54) SCENE REPRESENTATION USING IMAGE PROCESSING

(71) Applicant: IMPERIAL COLLEGE OF SCIENCE, TECHNOLOGY AND MEDICINE, London (GB)

(72) Inventors: Michael Bloesch, London (GB); Tristan William Laidlow, London (GB); Ronald Clark, London (GB); Andrew Davison, London (GB); Stefan Leutenegger, Munich (DE)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 231 days.

(21) Appl. No.: 17/687,053

(22) Filed: Mar. 4, 2022

(65) Prior Publication Data

US 2022/0189116 A1    Jun. 16, 2022

Related U.S. Application Data

(63) Continuation of application No. PCT/GB2020/052024, filed on Aug. 21, 2020.

(30) Foreign Application Priority Data

Sep. 6, 2019    (GB) .................................... 1912889

(51) Int. Cl.
*G06T 17/20*    (2006.01)
*G06N 3/08*    (2023.01)
(Continued)

(52) U.S. Cl.
CPC ............... *G06T 17/20* (2013.01); *G06N 3/08* (2013.01); *G06T 7/593* (2017.01); *G06T 7/73* (2017.01);
(Continued)

(58) Field of Classification Search
CPC .......... G06T 17/20; G06T 7/593; G06T 7/73; G06T 2207/20081; G06T 2207/20084;
(Continued)

(56) References Cited

U.S. PATENT DOCUMENTS

2018/0077400 A1    3/2018  Ayari et al.

FOREIGN PATENT DOCUMENTS

EP    3579195 A1    12/2019

OTHER PUBLICATIONS

Bloesch et al., "CodeSLAM—Learning a Compact, Optimisable Representation for Dense Visual SLAM", published in the 2018 IEEE/CVF Conference on Computer Vision and Pattern Recognition, Apr. 3, 2018.
(Continued)

*Primary Examiner* — Chong Wu
(74) *Attorney, Agent, or Firm* — EIP US LLP

(57) ABSTRACT

An image processing system configured to obtain a mesh representation of a scene, wherein the mesh representation comprises a plurality of polygons defined by respective vertices associated with an in-plane position, the in-plane position being in a plane comprising a first dimension and a second dimension, and the vertices having an associated vertex depth value in a third dimension different from the first dimension and the second dimension. The image processing system comprises an in-plane position estimation network configured to process image data representative of an image of the scene to estimate the in-plane positions associated with respective vertices of the mesh representation. The image processing system further comprises a depth estimation engine configured to process the in-plane positions and the image data to estimate the associated vertex depth values for the respective vertices of the mesh representation.

26 Claims, 6 Drawing Sheets

(51) Int. Cl.
*G06T 7/593* (2017.01)
*G06T 7/73* (2017.01)
*B25J 9/16* (2006.01)

(52) U.S. Cl.
CPC ... *B25J 9/1602* (2013.01); *G06T 2207/20081* (2013.01); *G06T 2207/20084* (2013.01); *G06T 2207/30244* (2013.01)

(58) Field of Classification Search
CPC . G06T 2207/30244; G06T 2207/10016; G06T 7/55; G06T 7/543; G06T 17/30; G06T 2207/10012; G06N 3/08; G06N 3/045; B25J 9/1602; G06F 30/23; H04N 19/54
See application file for complete search history.

(56) References Cited

OTHER PUBLICATIONS

Newcombe et al., "DTAM: Dense Tracking and Mapping in Real-Time", published in the 2011 International Conference on Computer Vision, Nov. 6, 2011.

Tang et al., "BA-NET: Dense Bundle Adjustment Networks", arXiv.org, Jun. 13, 2018.

Zhang et al., "MeshStereo: A Global Stereo Model with Mesh Alignment Regularization for View Interpolation", 2015 EEE Conference on Computer Vision (ICCV), Dec. 7, 2015.

Ronneberger et al., "U-Net: Convolutional Networks for Biomedical Image Segmentation", published in Medical Image Computing and Computer-Assisted Intervention—MICCAI 2015. MICCAI 2015. Lecture Notes in Computer Science, vol. 9351, May 18, 2015.

United Kingdom Combined Search and Examination report dated Mar. 9, 2020 for United Kingdom Application No. GB1912889.1.

International Search Report and Written Opinion dated Nov. 25, 2020 for PCT Application No. PCT/GB2020/052024.

Weerasekera et al., "Just-in-Time Reconstruction: Inpainting Sparse Maps using Single View Depth Predictors as Priors", Cornell University Library, May 11, 2018.

Tateno et al., "CNN-SLAM: Real-time dense monocular SLAM with learned depth prediction", Cornell University Library, Apr. 11, 2017.

Bloesch et al., "Learning Meshes for Dense Visual SLAM", 2019 IEEE/CVF International Conference on Computer Vision (ICCV), IEEE, Oct. 27, 2019.

SCENE REPRESENTATION USING IMAGE PROCESSING

CROSS-REFERENCE TO RELATED APPLICATIONS

This application is a continuation of International PCT Application No. PCT/GB2020/052024, filed Aug. 21, 2020 which claims priority to United Kingdom Application No. GB 1912889.1 filed Sep. 6, 2019, under 35 U.S.C. § 119(a). Each of the above referenced patent applications is incorporated by reference in its entirety.

FIELD OF THE INVENTION

The present invention relates to methods and systems for obtaining a representation of a scene using image processing. The invention has particular relevance to obtaining a mesh representation of the scene, which may for example be used by a robotic device to navigate and/or interact with its environment.

DESCRIPTION OF THE RELATED TECHNOLOGY

In the field of computer vision and robotics, there is often a need to construct a representation of an environment, such as a three-dimensional space that is navigable using a robotic device. Constructing a representation of a three-dimensional space allows a real-world environment to be mapped to a virtual or digital realm, where a map of the environment may be used and manipulated by electronic devices. For example, a moveable robotic device may require a representation of a three-dimensional space, which may be generated using simultaneous localisation and mapping (often referred to as "SLAM"), to allow navigation of and/or interaction with its environment.

There are several techniques available for constructing a representation of an environment. For example, structure from motion and multi-view stereo are two techniques that may be used to do this. Many techniques extract features from images of the environment, which are then correlated from image to image to build a three-dimensional representation. Certain techniques that use a reduced number of points or features to generate a representation are referred to as "sparse" techniques. For example, these techniques may use ten to a hundred features and/or points to generate the representation. These may be contrasted with "dense" techniques that generate representations with many thousands or millions of points. "Sparse" techniques have an advantage that they are easier to implement in real-time, e.g. at a frame rate of 30 frames-per-second or so; using a limited number of points or features limits the extent of the processing that is required to construct the three-dimensional representation. Comparatively it is more difficult to perform real-time "dense" mapping of an environment due to computational requirements. For example, it is often preferred to carry out a "dense" mapping off-line, e.g. it may take 10 hours to generate a "dense" representation from 30 minutes of provided image data.

The paper "CodeSLAM—Learning a Compact, Optimisable Representation for Dense Visual SLAM", by Bloesch et al., published in the Proceedings of the 2018 IEEE/CVF Conference on Computer Vision and Pattern Recognition, describes generating a code in a latent space of an autoencoder, from which a compact, dense representation of scene geometry can be generated.

Given existing techniques, there is still a desire for efficient representations of scenes.

SUMMARY

According to a first aspect of the present invention, there is provided an image processing system configured to obtain a mesh representation of a scene, wherein the mesh representation comprises a plurality of polygons defined by respective vertices associated with an in-plane position, the in-plane position being in a plane comprising a first dimension and a second dimension, and the vertices having an associated vertex depth value in a third dimension different from the first dimension and the second dimension, and the image processing system comprises: an in-plane position estimation network configured to process image data representative of an image of the scene to estimate the in-plane positions associated with respective vertices of the mesh representation, wherein the in-plane position estimation network comprises a neural network architecture comprising parameters obtained during training using a loss function based on a comparison between a predicted depth map and a ground-truth depth map, wherein the predicted depth map is computed from an output of the neural network architecture during the training; and a depth estimation engine configured to process the in-plane positions and the image data to estimate the associated vertex depth values for the respective vertices of the mesh representation.

In certain examples, the predicted depth map is computed from the output of the neural network architecture during the training using a transformation function for transforming vertex depth values associated with respective vertices of the mesh representation to pixel depth values associated with respective regions of the scene, wherein the transformation function depends on the output of the neural network architecture. In these examples, the transformation function may be obtained by rendering the predicted depth map. The transformation function may comprise barycentric weights associated with respective polygons of the plurality of polygons.

In certain examples, the neural network architecture comprises: at least one convolutional layer to detect image features of the image; and at least one fully connected layer to process image features for a plurality of patches of the image to estimate the in-plane positions.

In certain examples, the associated vertex depth values for the respective vertices of the mesh representation are inverse depth values, the predicted depth map represents predicted inverse depth values associated with respective spatial regions of the scene and the ground-truth depth map represents ground-truth inverse depth values associated with the respective spatial regions.

In certain examples, each polygon of the plurality of polygons is a triangle.

In certain examples, the in-plane position estimation network is configured to estimate the in-plane positions such that the plurality of polygons satisfy a size condition. The size condition may be satisfied by polygons with a length of less than or equal to a predetermined proportion of a length of the image, in at least one of the first and second dimensions.

In certain examples, the in-plane position estimation network is configured to estimate the in-plane positions such that the plurality of polygons are non-overlapping.

In certain examples, the depth estimation engine is configured to estimate the associated vertex depth values for the respective vertices of the mesh representation by optimising a cost function comprising a term dependent on the image data and the in-plane positions.

According to a second aspect of the present invention, there is provided an image processing system configured to obtain a mesh representation of a scene, wherein the mesh representation comprises a plurality of polygons defined by respective vertices associated with an in-plane position, the in-plane position being in a plane comprising a first dimension and a second dimension, and the vertices having an associated depth value in a third dimension different from the first dimension and the second dimension, and the image processing system comprises: an in-plane position estimation network configured to process image data representative of an image of the scene to estimate the in-plane positions associated with respective vertices of the mesh representation; and a depth estimation engine configured to: receive the in-plane positions and the image data; and optimise a cost function comprising a term dependent on the image data and the in-plane positions, to estimate the associated vertex depth values for the respective vertices of the mesh representation.

In certain examples, the image data comprises first image data representative of a first image of the scene and second image data representative of a second image of the scene which at least partly overlaps the first image, the term is a first term, and the cost function comprises a second term dependent on the first image data, the second image data, first pose data representative of a first pose of an image capture device during capture of the first image, and second pose data representative of a second pose of the image capture device during capture of the second image. In these examples, the depth estimation engine may be configured to optimise the cost function to jointly estimate the associated vertex depth values and the first pose of the image capture device. In these examples, the term may be a first term, the depth estimation engine may comprise a depth neural network architecture to predict at least one residual term based on the in-plane positions and the image data, the at least one residual term may comprise the first term and depend on the associated vertex depth values, and the cost function may comprise the at least one residual term. In such cases, the depth neural network architecture may comprise parameters obtained during a training process comprising: obtaining optimised values of the vertex depth values that optimise the cost function, given fixed values of the parameters of the depth neural network architecture; and obtaining optimised values of the parameters that optimise a loss function based on a comparison between a predicted depth map obtained using the optimised values of the vertex depth values and a ground-truth depth map. In these cases, obtaining the optimised values of the vertex depth values may comprise obtaining a respective value of the vertex depth values for each of a plurality of iterations, and obtaining the optimised values of the parameters may comprise computing a loss value of the loss function for each of the respective value of the vertex depth values and computing a combined loss based on the loss values.

In examples in which the depth estimation engine comprises a depth neural network architecture, the depth neural network architecture may be configured to: predict, using the in-plane positions, vertex residual terms associated with the respective vertices of the mesh representation; and obtain a term of the at least one residual term from the vertex residual terms.

In examples in which the depth estimation engine comprises a depth neural network architecture, the term may be a first term; the image data may comprise first image data representative of a first image of the scene and second image data representative of a second image of the scene which at least partly overlaps the first image; and the depth neural network architecture may comprise: a first neural network architecture to predict, using the first image data, the first term; and a second neural network architecture to predict, using the first image data and the second image data, a second term dependent on the first image data, the second image data, a first pose of an image capture device during capture of the first image, and a second pose of the image capture device during capture of the second image. In these examples, the depth estimation engine may be configured to use the second neural network architecture to predict, using the second image data and further image data representative of at least one further image of the scene, at least one further term dependent on the second image data, the further image data, the second pose of the image capture device during capture of the second image, and at least one further pose of the image capture device during capture of the at least one further image. The second neural network architecture may be configured to generate first feature data representative of first image features of the first image and second feature data representative of second image features of the second image and the second term may be based on a weighted comparison between the first image features for regions of the first image and the second image features for corresponding regions of the second image. The depth neural network architecture may comprise a third neural network architecture configured to process the first feature data and the second feature data to obtain weight data representative of weights for computing the weighted comparison.

In certain examples, the in-plane position estimation network comprises an in-plane neural network architecture comprising parameters obtained during training using a loss function based on a comparison between a predicted depth map and a ground-truth depth map, wherein the predicted depth map is computed from an output of the in-plane neural network architecture during the training.

According to a third aspect of the present invention, there is provided a robotic device comprising: the image processing system according to the first or second aspects of the present invention; one or more actuators to enable the robotic device to interact with a surrounding three-dimensional environment, wherein at least a portion of the surrounding three-dimensional environment is shown in the scene; and an interaction engine comprising at least one processor to control the one or more actuators.

According to a fourth aspect of the present invention, there is provided a method of training an in-plane position estimation network, the method comprising, for a training iteration: obtaining a set of training samples from a set of training data, wherein each of the training samples comprises image data representative of a scene and a ground-truth depth map of the scene; for each given training sample in the set of training samples: processing the image data for the given training sample using a neural network architecture of the in-plane position estimation network to obtain estimated in-plane positions associated with respective vertices of polygons of a mesh representation of the scene, wherein the estimated in-plane positions are in a plane comprising a first dimension and a second dimension; using the estimated in-plane positions to obtain a predicted depth map of the scene, wherein the predicted depth map comprises depth values associated with the respective vertices in a third dimension different from the first and second dimensions; and computing a loss function based on a comparison between the predicted depth map and the ground-truth depth map for the given training sample, wherein the training iteration is repeated to optimise the loss function to determine parameter values for the neural network architecture.

In certain examples, the method comprises: processing the image data for the given training sample using at least one convolutional layer of the neural network architecture to obtain feature data representative of image features for the given training sample; and processing the feature data for a plurality of image patches of the given training sample, corresponding to regions of the scene associated with respective vertices of the mesh representation with initial in-plane positions, using a fully-connected layer of the neural network architecture to compute a perturbation to the initial in-plane positions to obtain the estimated in-plane positions, wherein, prior to the perturbation, the vertices of the mesh representation are regularly spaced from each other in the plane.

Further features will become apparent from the following description, which is made with reference to the accompanying drawings.

DETAILED DESCRIPTION

Certain examples described herein enable a mesh representation of a scene to be obtained. A mesh representation typically comprises a plurality of polygons defined by respective vertices. The polygons may be considered to correspond to surface elements, representative of a surface of the scene modelled by the mesh representation. The vertices of the mesh representation in examples herein may represent or otherwise correspond with a position in a three-dimensional (3D) space. From the mesh representation, a position of a given region in the scene can be determined. Using a mesh representation allows a geometry of the scene to be represented in a dense manner, which is nevertheless computationally efficient. For example, a mesh representation may be a more compact representation of a scene than a depth map, which typically includes depth values representative of a distance between a given region of the scene and a given reference point.

Various polygons may be used in the mesh representation. For example, the polygons may include triangles or quadrilaterals, although this is not intended to be limiting. The polygons may include convex polygons, to simplify rendering of the mesh representation. At least some of the polygons may be irregular polygons, which have internal angles which are not all equal to each other and sides which are not all equal in length to each other. Each of the polygons may have the same number of sides as each other, or some polygons may have a different number of sides than others, e.g. some of the polygons may be triangles, and others may be quadrilaterals.

In examples herein, the vertices of the polygons of the mesh representation are associated with an in-plane position, in a plane comprising a first dimension and a second dimension. The vertices also have an associated vertex depth value in a third dimension different from the first dimension and the second dimension. The polygons of the mesh may themselves represent two-dimensional (2D) surfaces, but the vertices of the polygons may have a non-zero vertex depth value, so that different vertices may lie at a different distance with respect to the plane comprising the first and second dimensions. A mesh representation such as this may be considered to be a 2.5D mesh representation.

While a mesh representation can represent a 3D scene with a relatively small number of parameters (such as positions of vertices of polygons), relating a mesh representation to camera information typically involves a rendering process. Such a rendering process may be complex and too slow for real-time dense visual SLAM. However, use of a 2.5D mesh representation of a scene, which may be generated using the methods and/or systems herein, may allow an image or other representation of the scene to be rendered more efficiently, e.g. with reduced computational requirements.

Figure 1:
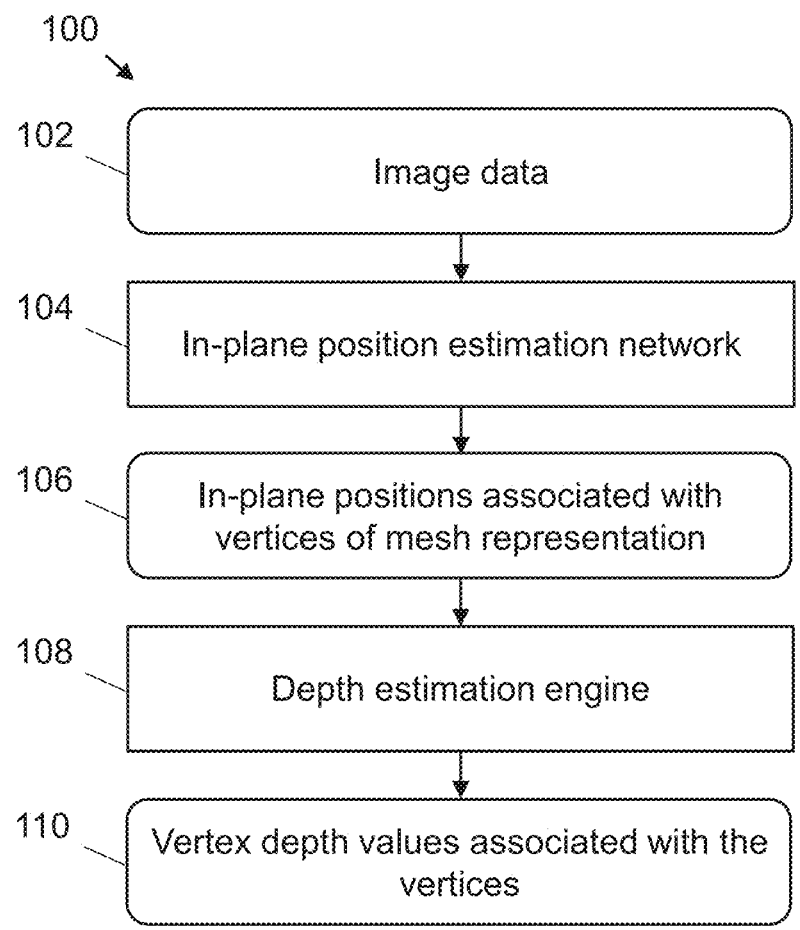
FIG. 1 is a schematic diagram showing an image processing system configured to obtain a mesh representation of a scene according to examples.

FIG. 1 shows schematically an image processing system 100 configured to obtain a mesh representation of a scene according to examples. The image processing system 100 is configured to receive image data 102 representative of an image of a scene. The image data 102 for example represents photometric characteristics of the scene, such as a brightness, intensity or colour. The image data 102 may represent the image using an array of pixel values representative of these photometric characteristics. The image may be a grayscale or colour image. The image data 102 may be obtained by any suitable image capture device, such as a camera or a video camera. The image may correspond to a frame of a video (e.g. obtained from video data) or may be a still image, e.g. obtained from a singular capture of the scene.

The scene is for example a 3D space, which may be an internal and/or an external physical space, e.g. at least a portion of a room or a geographical location. The scene may include a lower surface, e.g. a floor, or may be an aerial or extra-terrestrial scene.

An in-plane position estimation network 104 of the image processing system 100 is configured to process the image data 102 to estimate in-plane positions 106 associated with respective vertices of a mesh representation of the scene. The in-plane positions 106 may comprise a set of (x, y) coordinates that define a location for each vertex in an x, y plane. This location may correspond with a pixel location, corresponding to a location of a pixel of the image data 102.

A depth estimation engine 108 of the image processing system 100 is configured to process the in-plane positions 106 and the image data 102 to estimate the associated vertex depth values 110 for the respective vertices of the mesh representation. The vertex depth value 110 for a given vertex may be any quantity from which a depth may be obtained. For example, the vertex depth value 110 for a given vertex may be a value representing a depth or an inverse depth, which may be expressed relative to the plane associated with the in-plane positions 106.

Using the image processing system 100 of FIG. 1, positions of the vertices of the polygons of the mesh representation in three dimensions may be obtained, in order to provide a compact representation of a dense geometry of the scene. The in-plane positions 106 and the vertex depth values 110 may be expressed as coordinates in any suitable coordinate system. For example, the in-plane position and the vertex depth values may be expressed as coordinates with respect to a frame associated with an image capture device used to capture an image of the scene. In some cases, these coordinates are Cartesian coordinates. In other cases, though, other coordinate systems may be used, such as homogeneous coordinates. Using homogeneous coordinates allows common transformations, such as translations, rotations and scalings, to be represented as a matrix by which a vector (e.g. representative of the homogeneous coordinates) is multiplied. This is more straightforward than with other coordinate systems, in which some of these transformations cannot be represented as matrix multiplications.

The vertex depth values may be inverse depth values. In this way, if the in-plane positions of k vertices are expressed as $c_k$, and the inverse depth values associated with respective vertices are expressed as $x_k$, the position of a given vertex, $v_k$, may be expressed as $k=c_k/c_k$. $c_k$ may for example be in the form of (x, y) coordinates in an x, y plane. The x, y plane may be parallel to or the same as a plane of the image. For example, the positions of the k vertices may correspond to respective pixel positions of pixels of the image in the plane of the image. The uncertainty associated with inverse depth values more closely follows a Gaussian distribution than otherwise, making these uncertainties easier to model. Furthermore, the relationship between an inverse depth map (e.g. representing inverse depths corresponding to respective regions of the scene, e.g. as inverse depth pixels) and the inverse depth values associated with respective vertices is linear if the polygons are planar in 3D. This allows the inverse depth map to be retrieved from the inverse depth values of the vertices using a linear map, as discussed further with respect to FIG. 4.

In the image processing system 100, the in-plane positions 106 of the vertices are obtained separately from the vertex depth values 110. Determining the in-plane positions 106 and the vertex depth values 110 separately for example allows a mesh representation of the scene to be obtained more efficiently. For example, both the in-plane position estimation network 104 and the depth estimation engine 108 may be separately tuned to optimise the accuracy of a depth map obtainable using the mesh representation. The depth map may therefore be obtained more efficiently than otherwise. Optimising the image processing system 100 on the basis of reconstruction of a depth of the scene in turn ensures that the mesh representation of the scene more closely captures the geometry of the scene. Using the image processing system 100 therefore allows an accurate and efficient representation of the scene to be obtained. For example, the in-plane positions 106 may be treated as learnable quantities that are predicted by a neural network architecture of the in-plane position estimation network 104. The vertex depth values 110 may, however, be treated as a degree of freedom of the image processing system 100. The vertex depth values 110 in examples are not predicted by a neural network architecture. In such examples, the vertex depth values 110 are instead obtained through an optimisation procedure.

In some examples, the in-plane position estimation network 104 of FIG. 1 comprises a neural network architecture comprising parameters obtained during training using a loss function based on a comparison between a predicted depth map and a ground-truth depth map. The predicted depth map is computed from an output of the neural network architecture during the training. Training of the in-plane position estimation network 104 is discussed further with reference to FIG. 4.

In some examples, the depth estimation engine 108 is configured to estimate the associated vertex depth values for the respective vertices of the mesh representation by optimising a cost function comprising a term dependent on the image data and the in-plane positions. This is described further with reference to FIG. 5.

Figure 2:
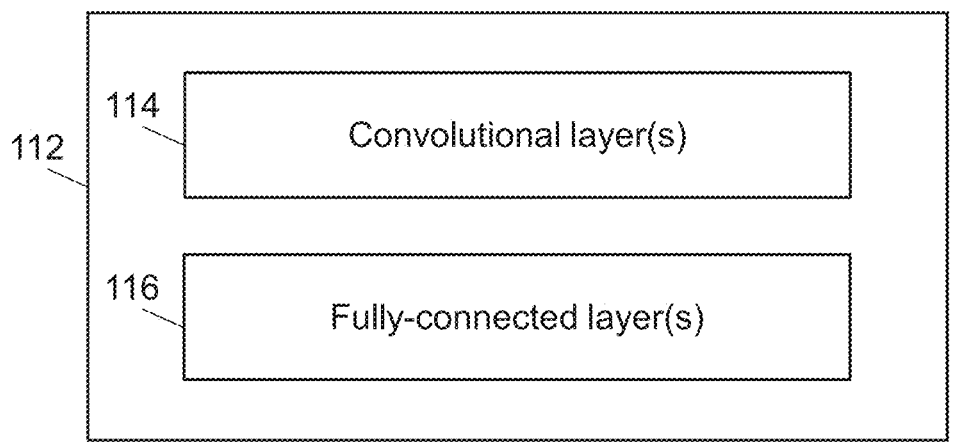
FIG. 2 is a schematic diagram showing a neural network architecture for using the generation of a mesh representation of a scene according to examples.

A neural network architecture 112 according to examples is shown schematically in FIG. 2. The in-plane position estimation network 104 of FIG. 1 may use a neural network architecture such as the neural network architecture 112, although this need not be a case. The neural network architecture 112 of FIG. 2 includes at least one convolutional layer 114 to detect image features of an image and at least one fully connected layer 116 to process image features for a plurality of patches of the image to estimate the in-plane positions of the vertices of the mesh representation.

Figure 3:
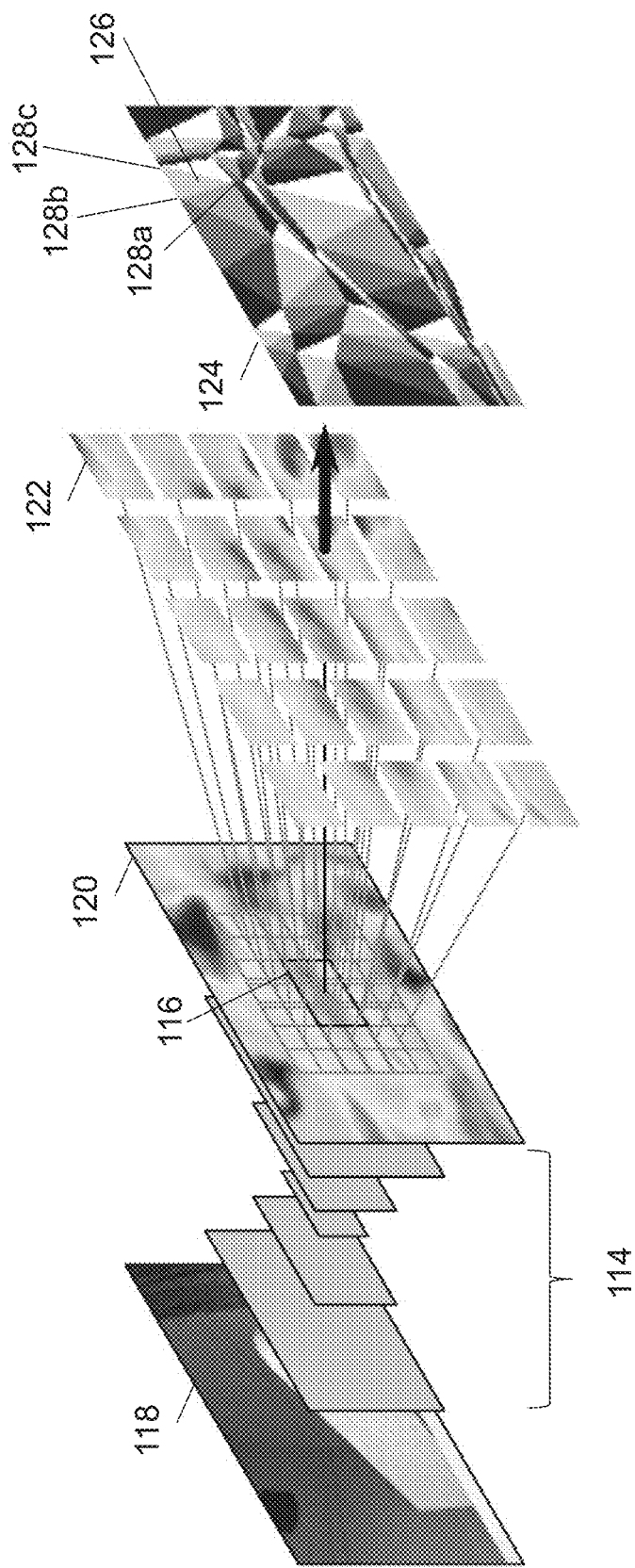
FIG. 3 is a schematic diagram showing the estimation of in-plane positions of vertices of a mesh representation according to examples.

FIG. 3 is a schematic diagram showing the estimation of in-plane positions of vertices of a mesh representation using the neural network architecture 112 of FIG. 2. An image 118 of a scene is received. In the example of FIG. 3, the image 118 represents a portion of a larger image of the scene, e.g. corresponding to a region of interest (ROI). However, in other cases, the image received may be an entire image, or of an entirety of a scene.

Image data representative of the image 118 is processed by the at least one convolutional layer 114 of the neural network architecture. In this case, five convolutional layers are illustrated, although this is merely an example. The neural network architecture may be a convolutional neural network (CNN), such as a fully convolutional network.

In FIG. 3, the convolutional layers 114 form part of a so-called "U-Net", which is an example of a fully convolutional network. A U-Net architecture is described in the 2015 paper "U-Net: Convolutional networks for biomedical image segmentation" by Ronneberger et al (incorporated by reference where applicable). Such a U-Net may include a contracting path, which is sometimes referred to as a downsampling path. The contracting path may include a set of downsampling, which are each arranged to obtain image features with a given resolution. Each downsampling block may include a convolution, followed by a rectified linear unit (ReLU) and a max pooling operation. During the contracting path, the spatial information is reduced. However, the feature information is increased, e.g. by increasing the number of feature maps at each stage. In this way, a representation of the image with increasing coarseness but an increasing dimensionality of the image features may be obtained. The U-Net also includes an expanding path, which is sometimes referred to as an upsampling path. The expanding path may include a set of upsampling blocks. Each upsampling block for example combines feature and spatial information obtained by the contracting path, e.g. using an up-convolution and concatenation. In this way, the upsampling blocks are arranged to obtain image features at a plurality of different resolutions. The U-Net may have for example four pairs of downsampling convolutions and four pairs of upsampling convolutions with corresponding skip layers. The first convolutional layer in each pair may use a stride of 2 and the size of feature channels obtained may be (16, 16, 32, 32, 64, 64, 128, 128) for the upsampling blocks, with analogous settings for the downsampling blocks. The convolutions may have a kernel size of 3, except for the first which may have a kernel size of 7. The use of U-Net is merely an example, though, and the at least one convolutional layer 114 may be arranged in a different architecture in other examples.

The output of the at least one convolutional layer 114 in FIG. 3 is feature data representative of image features 120 of the image. The feature data may represent the image features on a pixel-by-pixel basis. The image features may therefore be referred to as pixel-wise image features. The image features are for example corners, edges, shapes, colours etc. of the image. In order to determine the in-plane coordinates associated with the vertices of the mesh representation, the image is divided into image regions, which may be referred to as patches. The image patches may be of any shape or size, and may be different sizes and shapes from each other, or all of the same shape and/or size. In FIG. 3, the image patches are 25×25 pixels in size, although this is merely an example.

In some examples, the image patches correspond to regions of the scene associated with the respective vertices of the mesh representation with initial in-plane positions. The initial in-plane positions for example represent an initial estimate of an in-plane position of respective vertices of the polygons of the mesh representation in the plane. The mesh representation with the vertices located at the initial in-plane positions may be considered to correspond to an initial mesh representation. The initial mesh representation may be a regular mesh, with vertices of the polygons that are regularly spaced from each other in the plane. For example, a regular mesh may include N equidistant vertex rows and M and (M−1) vertices on alternate rows, with an equal distance between vertices of a given row. In some cases, vertices may be considered regularly spaced where the vertices are arranged in a regular or repeating pattern, which need not involve equal distances between each of the vertices. In this example, the polygons of the initial mesh representation are triangles. The initial mesh representation may therefore be referred to as a triangular mesh.

Corresponding image features for the image patches may then be obtained from the output of the convolutional layers 114, to a obtain a plurality of image feature patches. One of the image feature patches is labelled with the reference numeral 122 in FIG. 3; other labels are omitted, for clarity.

In the example of FIG. 3, each of the image feature patches is processed using a fully-connected layer 116 (in this case, a single layer, although more than one layer may be used in other cases). Processing of the image feature patches with the fully-connected layer 116 computes a perturbation to the initial in-plane positions of the vertices, e.g. to the regular triangular grid of FIG. 3. The perturbation for example represents in-plane coordinates representative of an amount by which the estimated in-plane positions of the vertices differs from the initial in-plane positions of the vertices. The estimated in-plane positions of vertices may then be obtained by combining (e.g. by adding) the perturbation to the initial in-plane positions. With this approach, the contribution of the convolutional layers 114 is maximised, and all of the vertices are treated in the same way.

In some cases, vertices with initial in-plane positions which lie on a border of the image are constrained to remain on the border of the image. For example, a perturbation to such initial in-plane positions may not be applied. This simplifies the determination of the estimated in-plane positions.

In this way, an in-plane mesh representation 124 of the scene may be obtained. The in-plane mesh representation 124 includes a plurality of polygons, one of which is labelled with the reference numeral 126 in FIG. 3, which in this example are triangles. The polygon 126 is defined by vertices 128a, 128b, 128c, which each have a respective estimated in-plane position obtained by the neural network architecture (which in FIG. 3 includes the convolutional layers 114 and the fully-connected layer 116).

Further constraints to the polygons and/or vertices may be applied in addition to or instead of the constraint on the in-plane position of border vertices. This may simplify or accelerate the computation of the estimated in-plane positions. For example, the in-plane position estimation network may be configured to estimate the in-plane positions such that the plurality of polygons satisfy a size condition. The size condition may, for example, be satisfied by polygons with a length of less than or equal to a predetermined proportion of a length of the image, in at least one of the first and second dimensions. For example, the size of the polygons of the mesh representation may be constrained to be less than or equal to half the image height. The in-plane position estimation network may additionally or alternative be configured to estimate the in-plane positions such that the plurality of polygons are non-overlapping. For example, each polygon may share at least one vertex with another polygon, but the internal area occupied by each of the polygons, in the plane, may be entirely non-coincident. These constraints may be enforced by the neural network architecture of the in-plane position estimation network, such as that described with reference to FIGS. 2 and 3.

Figure 4:
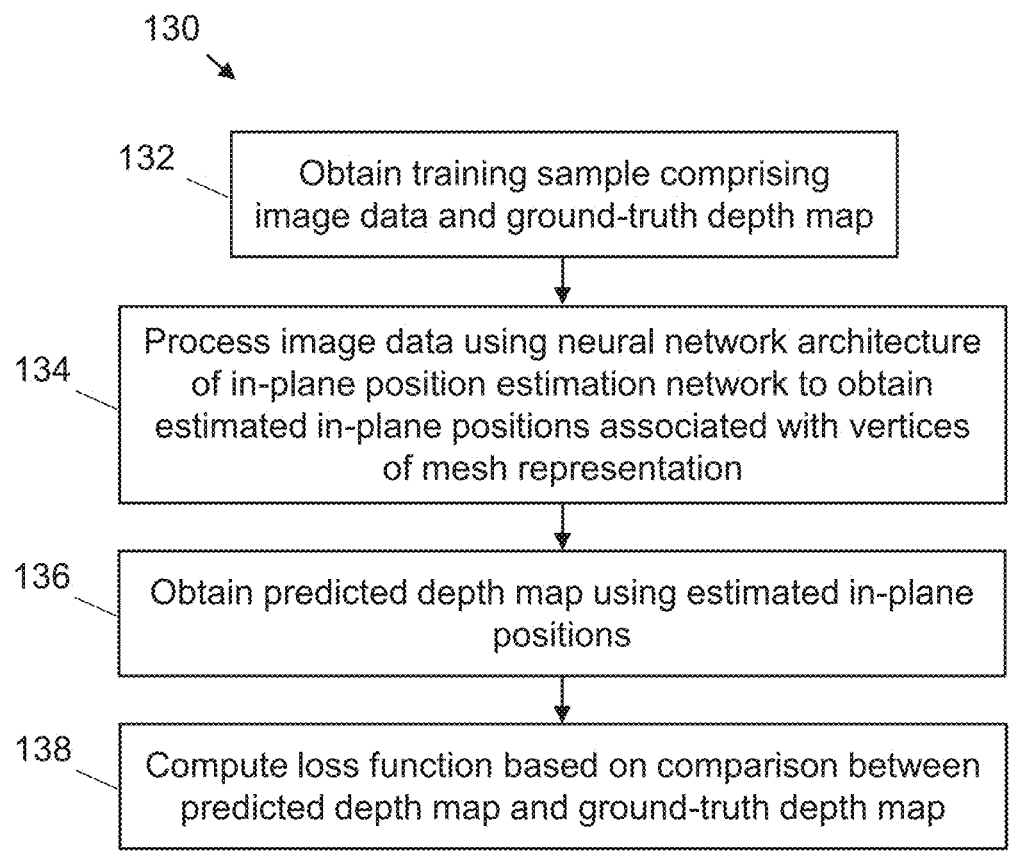
FIG. 4 is a flow diagram showing a training iteration for training an in-plane position estimation network according to examples.

FIG. 4 is a flow diagram showing a training iteration 130 for training an in-plane position estimation network according to examples, such as those of FIGS. 1 to 3. The training iteration uses a loss function to enable optimisation of parameter values for the in-plane position estimation network. For example, the aim of training may be to minimise the loss function, to update the parameter values.

The training process is for example designed to obtain a trained in-plane position estimation network that may be used to generate a mesh representation of a scene that is suitable for representing view-based 3D geometry. To do this, a loss function depending on the 3D reconstruction may be used to train the in-plane position estimation network. For example, for a given set of in-plane positions of vertices of a mesh representation of a scene, corresponding vertex depth values may be obtained that best fit a depth map of the scene. In this way, the in-plane position estimation network may be trained to output in-plane positions of vertices of a mesh representation of a scene that result in lower reconstruction errors, e.g. so that a depth map obtainable from the mesh representation more closely matches the actual depth of the scene.

At item 132 of FIG. 4, a set of training samples is obtained from a set of training data. Each of the training samples comprises image data representative of a scene and a ground-truth depth map of the scene.

At item 134 of FIG. 4, the image data for a given training sample is processed using a neural network architecture of the in-plane position estimation network to obtain estimated in-plane positions associated with respective vertices of polygons of a mesh representation of the scene. As explained with reference to FIGS. 1 to 3, the estimated in-plane positions are in a plane comprising a first dimension and a second dimension.

The neural network architecture used at item 134 of FIG. 4 may be similar to or the same as that described with reference to FIGS. 2 and 3. For example, the image data for the given training sample may be processed using at least one convolutional layer of the neural network to obtain feature data representative of image features for the given training sample. The feature data may be processed for a plurality of image patches of the given training sample, corresponding to regions of the scene associated with respective vertices of the mesh representation with initial in-plane positions, using a fully-connected layer of the neural network architecture to compute a perturbation to the initial in-plane positions to obtain the estimated in-plane positions. Prior to the perturbation, the vertices of the mesh representation may be regularly spaced from each other in the plane. In this way, an in-plane mesh representation such as that of FIG. 3 may be obtained.

At item 136 of FIG. 4, the estimated in-plane positions are used to obtain a predicted depth map of the scene for the given training sample. The predicted depth map comprises depth values associated with the respective vertices in a third dimension different from the first and second dimensions.

The predicted depth map may be computed from the output of the neural network architecture during the training using a transformation function for transforming vertex depth values associated with respective vertices of the mesh representation to pixel depth values associated with respective regions of the scene. The transformation function for example depends on the output of the neural network architecture.

For example, where the vertex depth values are inverse depth values, the predicted depth map may be related to the vertex depth values by a linear transformation function, which may be referred to as a linear map. This may be expressed as:

$$D(x) = J(c)x$$

where $D(x)$ is an estimated inverse depth map of the scene, x represents the vertex depth values (which in this case are inverse depth values), c represents the in-plane positions of the vertices, and $J(c)$ is the transformation function. In these cases, the predicted depth map represents predicted inverse depth values associated with respective spatial regions of the scene.

The transformation function may comprise for example applying barycentric weights associated with respective polygons of the plurality of polygons. For example, the depth value associated with a non-vertex position within a polygon, which is not coincident with one of the vertices may depend on a weighted combination of the depth values associated with each of the vertices of the polygon. The weights used for the weighted combination may depend on the in-plane positions of the vertices, and may be considered to correspond to barycentric weights.

The transformation function may be a sparse matrix, as the vertex depth values for a given polygon may depend merely on the in-plane positions of the vertices of that given polygon. For example, where the mesh representation is formed of a plurality of triangles, the vertex depth values for a given polygon may depend on the in-plane positions of three vertices.

The transformation function may be obtained by rendering the predicted depth map, using the output of the neural network architecture for the given training sample. The output of the neural network architecture in this case corresponds to predicted in-plane positions of vertices of a mesh representation of the scene represented in the image of the given training sample, with the current parameter values of the neural network architecture. This allows the transformation to be obtained straightforwardly. The predicted depth map may be rendered using a differentiable renderer, which simplifies optimisation of the vertex depth values using the depth estimation engine.

At item 138 of FIG. 4, a loss function is computed based on a comparison between the predicted depth map and the ground-truth depth map for the given training sample. In examples in which the vertex depth values are inverse depth values and the predicted depth map represents predicted inverse depth values, the ground-truth depth map represents ground-truth inverse depth values associated with the respective spatial regions.

In examples in which the relationship between the vertex depth values and a ground-truth depth map are linear, the vertex depth values that best fit a ground-truth depth map can be computed by solving the normal equation:

$$J(c)^T J(c) x = J(c)^T D$$

where J, c and x are as defined above, and D represents the ground-truth depth map. However, as the mesh representation is generally an approximation of the scene, there is typically some remaining reconstruction error. By eliminating x, the reconstruction error, E, may be expressed as:

$$E = (I - J(c)(J(c)^T J(c))^{-1} J(c)^T) D$$

where I is the identity matrix. This for example corresponds to a difference between the predicted depth map and the ground-truth depth map.

This reconstruction error may be used in the loss function. Hence, minimising the loss function for example involves minimising the reconstruction error, to train the in-plane position estimation network to predict in-plane positions that result in lower reconstruction errors. In general, predicting in-plane positions to coincide with regions of high curvature in a scene may minimise the reconstruction error. In this way, the in-plane position estimation network may be trained to predict a higher density of vertices corresponding to regions of high curvature in the scene, allowing a depth associated with those regions to be more accurately predicted. In examples such as this, the loss function may be expressed as $\|E\|^2$, which for example corresponds to $\|D-D^*\|^2$, where $D^*$ corresponds to the predicted depth map.

Use of a loss function such as this allows the neural network architecture to be trained even if ground-truth depth data is unavailable for some pixels of an image. In such cases, these pixels may be omitted when evaluating the loss function. The training process is therefore more flexible than other approaches that rely on a complete depth map for training.

The training iteration 130 in examples is repeated to optimise the loss function to determine parameter values for the neural network architecture. For example, backpropagation may be used to compute gradients of the loss function with respect to respective parameters of the neural network architecture. The parameter values may then be updated for each of a plurality of training iterations via stochastic gradient descent, using the gradients computed via backpropagation.

In this way, the neural network architecture may be trained using a different parameter (depth values) than the parameter it is being trained to predict (in-plane positions of vertices of a mesh representation). Training the neural network architecture in this way reduces the reconstruction error associated with a depth map obtainable from the mesh representation when using the image processing system as a whole. For example, the image processing system may be trained in an end-to-end manner, to predict the mesh representation of a scene that minimises a depth reconstruction error.

Figure 5:
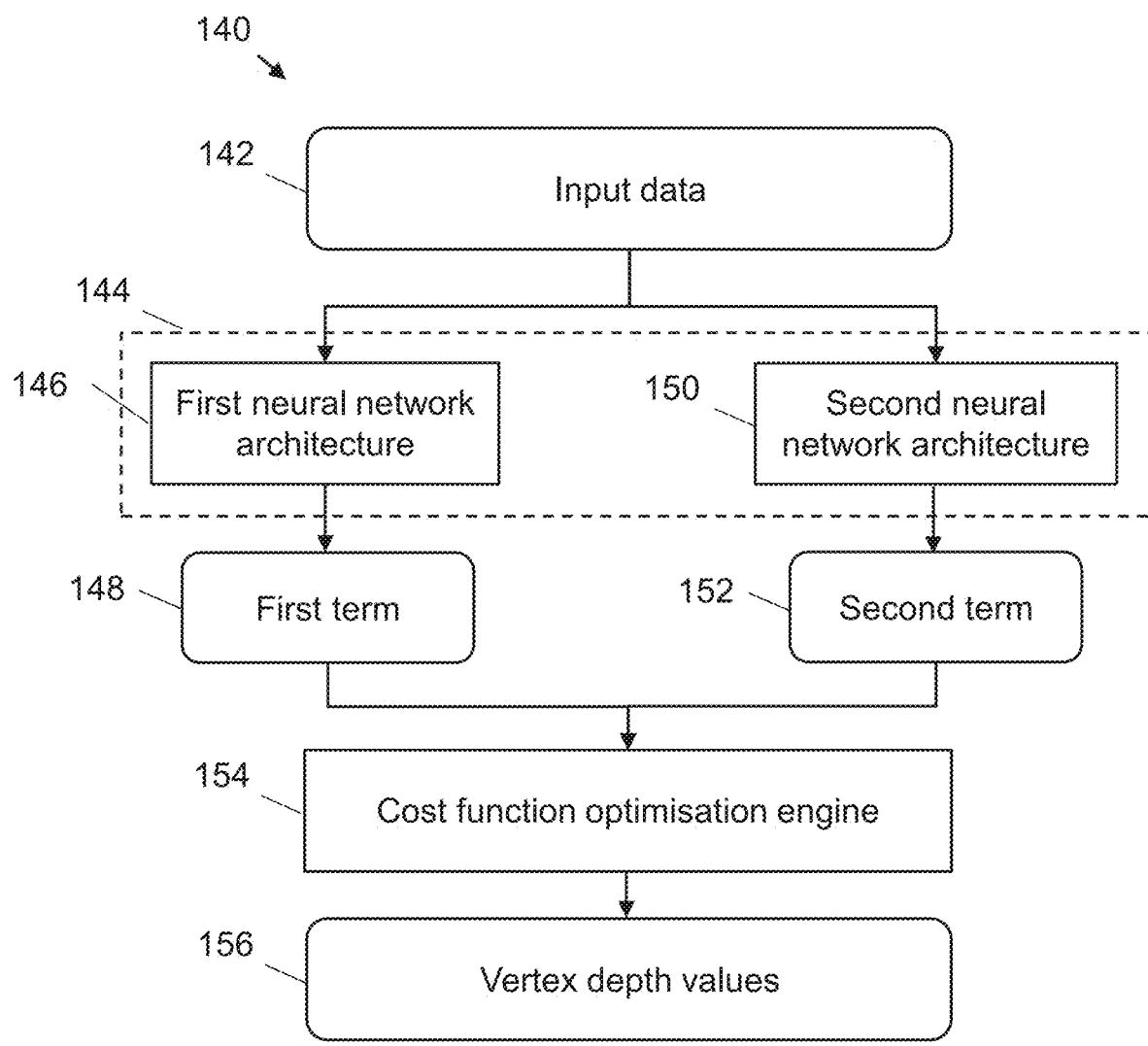
FIG. 5 is a schematic diagram showing a depth estimation engine configured to obtain vertex depth values of vertices of a mesh representation according to examples.

FIG. 5 is a schematic diagram showing a depth estimation engine 140 configured to obtain vertex depth values of vertices of a mesh representation according to examples. The depth estimation engine 108 of FIG. 1 may use the depth estimation engine 140 of FIG. 5 or a different depth estimation engine.

The depth estimation engine 140 processes input data 142 to obtain the vertex depth values. The input data 142 for example includes in-plane positions of vertices of polygons of a mesh representation of a scene and image data representative of at least one image. The in-plane positions may be generated by an in-plane position estimation network configured to process the image data to estimate the in-plane positions. The in-plane position estimation network may be the same as or similar to the in-plane position estimation networks described with reference to FIGS. 1 to 4, or may be different. The input data 142 may also include pose data representative of a pose of an image capture device during capture of the at least one image.

The depth estimation engine 140 in FIG. 5 is configured to optimise a cost function comprising a term dependent on the image data and the in-plane positions to estimate the vertex depth values for the respective vertices of the mesh representation. The depth estimation engine 140 of FIG. 5 is shown with a particular architecture. However, this architecture is merely an example, and other architectures may be used in other examples.

The term dependent on the image data and the in-plane positions is for example a first term, which depends on the image of the scene. For example, the first term may be considered to encode prior knowledge on the scene geometry, e.g. to penalise rough mesh representations that are unlikely to correspond to real scenes. In this way, the vertex depth values may be obtained from a single image of a scene. An example of the first term 148 is discussed further below.

In some cases, multiple images of the scene, e.g. multiple frames of video data, may be used to obtain the vertex depth values. In such cases, the image data received by the depth estimation engine 140 includes first image data representative of a first image of the scene and second image data of the scene which at least partly overlaps with the first image. In other words, a region of the scene which is captured in the first image may also be present in the second image. At least one of the first or second images may be a keyframe. A keyframe may be a keyframe as designated by an external system, e.g. an external SLAM system. Keyframes may be designated as such e.g. after a certain amount of time has elapsed since a previous keyframe or after the image capture device has moved by a certain amount since the previous keyframe. A keyframe may correspond to a frame of a video for which a more complete depth estimate is to be obtained, and may correspond to or includes a new portion of a scene for which a mesh representation has not previous been obtained or a portion of a scene which is identified as being more feature-rich than other portions. For example, the first frame of a video, for which no mesh representation has been obtained previously, may be considered to be a keyframe. A key frame may be a key frame as designated by an external system, e.g. an external SLAM system.

The cost function in these cases may include, in addition to or instead of the first term, a second term dependent on the first image data, the second image data, first pose data representative of a first pose of an image capture device during capture of the first image, and second pose data representative of a second pose of the image capture device during capture of the second image. The orientation and location of the image capture device, e.g. as set out in a 6DOF transformation matrix, may be defined as the pose of the image capture device. The pose of the image capture device may vary over time, e.g. as video data or a series of still images is recorded, such that a capture device may have a different pose at a time t+1 (e.g. at which the first image is captured) than at a time t (e.g. at which the second image is captured).

At least one of the first and second pose may be optimisable quantities, to estimate a relative pose of the image capture device, which may be expressed as a difference between the first pose and the second pose. For example, the depth estimation engine 140 may be configured to optimise the cost function to jointly estimate the associated vertex depth values and the first pose of the image capture device (which may be expressed as a relative pose). With this approach, the estimation of the geometry of an environment and a motion of the image capture device may be jointly estimated. This can be formulated as a factor graph, where each image is associated with two variables: the pose and the vertex depth values.

In other cases, at least one of the first and second pose data may be obtained separately, rather than using the depth estimation engine 140. For example, various different camera pose estimation algorithms may be used to obtain the first and/or second pose data, which may then be used as an input to the depth estimation engine 140.

In FIG. 5, the depth estimation engine 140 includes a depth neural network architecture 144 to predict at least one residual term based on the in-plane positions and the image data. The at least one residual term includes the term dependent on the image data and the in-plane positions, which is referred to herein as a first term. A residual term for example provides a measure of a difference between a measured value and a predicted value, and may correspond to an error term. Typically, the larger the difference between the measured and predicted values, the larger the residual term. Hence, minimisation of a difference between the measured and predicted values (e.g. by minimising the residual term or a function based on the residual term, such as the cost function) may be used to determine optimal parameters of model from which the predicted values may be obtained. In this example, the at least one residual term depends on the vertex depth values associated with the vertices of the mesh representation, and the cost function comprises the at least one residual term. Hence, by minimising the cost function, optimal values of the associated vertex depth values may be obtained.

In the example of FIG. 5, the depth neural network architecture 144 includes a first neural network architecture 146 which is configured to predict a first term 148 dependent on the vertex depth values of vertices of a mesh representation. In other examples, though, the first term 148 may be obtained through deterministic computation. The first neural network architecture 146 of FIG. 5 is configured to process first image data representative of a first image of a scene to predict the first term 148. The first term 148 in this case is a first residual term, which is connected to the depths of the first image. The first term 148 may be considered to correspond to a prior factor, encoding a probability of vertex depth values given a particular input image. The first term can be used to encode a smoothness constraint and reduce curvature of the mesh representation.

In this case, the first neural network architecture 146 has been trained to predict data-driven first term. Any suitable architecture may be used. For example, the first neural network architecture 146 may have a structure which is similar to or the same as the structure of the neural network architecture 112 of FIGS. 2 and 3, including at least one convolutional layer and at least one fully-connected layer.

In some cases, the depth neural network architecture 144 (e.g. the first neural network architecture 146 of the depth neural network architecture 144) may be configured to predict, using the in-plane positions, vertex residual terms associated with the vertices. A term of at least one residual term (e.g. the first term 148) may be obtained from the vertex residual terms. In this way, the mesh representation may be constrained, on a per-vertex basis, based on prior knowledge of suitable mesh representations.

For example, the first neural network architecture 146 may be a U-Net, which is configured to obtain feature data representative of features of the first image using the at least one convolutional layer. Image feature patches corresponding to regions of the scene associated with respective vertices of the mesh representation with the in-plane positions received as the input data 142 may be extracted, e.g. as described with reference to FIG. 3. In this way, per-vertex image feature patches may be obtained. Based on these per-vertex image feature patches, at least one prior term may be calculated. In one case, based on the per-vertex image feature patches, three different types of linear sparse priors are computed. In order to encode vertex depth information, a per-vertex image feature patch, $P_k$, may be transformed to a first prior, $p_v(x_k) = a_v(P_k)x_k + b_v(P_k)$, where $x_k$ represents a vertex depth value of the kth vertex, and $a_v$ and $b_v$ are implemented as fully-connected layers of the first neural network architecture 146. The second prior in this case encodes polygon-related information, such as inclination cues. For example, for every polygon within the per-vertex image feature patch, a linear residual may be computed as the second prior. The third prior in this case encodes edge information. For example, for each of the edges connecting vertices of two adjacent polygons within the per-vertex image feature patch, a linear residual may be computed as the third prior. The computed priors may be aggregated into a sparse matrix $A(I)$ and a vector $b(I)$ to obtain the first term 148, which in this case is a combined linear prior, $p(x)$, on the vertex depth values, x:

$$p(x) = A(I)x + b(I)$$

where I represents the input image (the first image in this case), and $A(I)$ and $b(I)$ are predicted by the first neural network architecture 146 as described above.

The depth neural network architecture 144 in the example of FIG. 5 also includes a second neural network architecture 150 which is configured to predict a second term 152. The second term 152 is connected to a first pose of an image capture device during capture of a first image of the scene and a second pose of the image capture device during capture of a second image of the scene, which at least partly overlaps the first image. For example, the first and second images may be keyframes of video data representing an observation of the scene. The second term 152 is also dependent on the first image data and the second image data. The second neural network architecture 150 predicts the second term 152 by processing the first image data and the second image data. The second neural network architecture 150 may also process first pose data representative of the first pose and/or second pose data representative of the second pose. Alternatively, the first and/or second pose data may be obtained by the depth estimation engine 140, e.g. during joint optimisation of the vertex depth values and the pose(s).

In this example, the second term 152 is a second residual term, which may be considered to correspond to a stereo factor. As the second term 152 is connected to the poses and image content of two images of the scene with overlapping information, the second term 152 combines the information from both of the images with the knowledge that both are observations of the same scene. In this way, the overlapping fields of view between the first and second images may be exploited.

In FIG. 5, the second neural network architecture 150 is trained to predict a second term 152 with appropriate properties, e.g. so that the second term 152 is scale independent and can be computed in a computationally efficient manner. In other examples, though, the second term 152 may be obtained through deterministic computation. The second neural network architecture 150 may have any suitable structure. In one case, the second neural network architecture 150 has a structure which is similar to or the same as the structure of the neural network architecture 112 of FIGS. 2 and 3, including at least one convolutional layer and at least one fully-connected layer.

The second neural network architecture 150 may be configured to process the first image data to obtain first feature data representative of features of the first image, and to process the second image data to obtain second feature data representative of features of the second image. In such cases, the second term 152 may be predicted based on a weighted comparison between the first image features for regions of the first image and the second image features for corresponding regions of the second image. The depth neural network architecture 144 in such cases may include a third neural network architecture configured to process the first feature data and the second feature data to obtain weight data representative of weights for computing the weighted comparison.

In one example, the second term 152 is represented as a stereo factor, $s_{iju}(x_i, x_j, T_i, T_j)$, where $x_i$ represents vertex depth values for the first image, $x_j$ represents vertex depth values for the second image, $T_i$ represents the first pose during capture of the first image, and $T_j$ represents second pose during capture of the second image. In this case, if the processing by the second neural network architecture 150 is represent as Y, the second term 152 may be computed as:

$$s_{iju}(x_i, x_j, T_i, T_j) = r(Y(I_i)[u_i], Y(I_j)[u_j])$$

where r represents a mapping (discussed further below), $I_i$ represents the first image, $I_j$ represents the second image, $[u_i]$ represents a pixel lookup at a pixel of the first image, and $[u_j]$ represents a pixel lookup at a corresponding pixel of the second image. Although the stereo factor in this case may be considered to depend on vertex depth values for the first and second images respectively, it is to be appreciated that mesh representations of the first and second images need not be explicitly computed during the determination of the stereo factor. However, the stereo factor may nevertheless depend on or otherwise capture underlying information regarding vertex depth values for the first and second images, for example based on correspondences between respective pixels of the first and second images. For example, vertex depth values associated with the second image may be determined from a mesh representation associated with the first image based on a correspondence between pixels of the first image and the second image, without explicitly computing a separate mesh representation associated with the second image.

The mapping applied by r in this case is between the output of the second neural network architecture 150 for a given pixel in the first image and the output of the second neural network architecture 150 for a corresponding pixel in the second image, which represents the same part of the same as the given pixel in the first image. In this case, the output of the second neural network architecture 150 may be the output after at least one convolutional layer, such as the convolutional layers 114 of FIG. 3, which represents image features of an input image. In such cases, the second neural network architecture 150 may not include a fully-connected layer. Hence, after predicting features in both the first and second images and matching them, e.g. via computing dense correspondences, the mapping r generates a per-pixel residual. The mapping $r(y_i, y_j)$ may be expressed as:

$$r(y_i, y_j) = (y_i^n - y_j^n) \cdot w(y_i, y_j)$$

where $y_i$ is the output of the second neural network architecture 150 for a given pixel in the first image, $y_j$ is the output of the second neural network architecture 150 for a corresponding pixel in the second image and $(y_i^n - y_j^n)$ computes the difference of the nth elements of the image features (for example in the form of feature vectors) for the first and second images. The $w(y_i, y_j)$ represents a weight for computing a weighted comparison between the first and second image features as the residual. The weight term in this case is obtained by a third neural network architecture, e.g. a multilayer perceptron (MLP). The weight can be used to down-weight or otherwise reduce the contribution of unreliable correspondences to the second term 152. For example, the contribution of terms corresponding to parts of the scene with high reflectance, which may be difficult to obtain an accurate correspondence for, may be down-weighted by the weight.

Although in FIG. 5 the second term 152 is obtained by the second neural network architecture 150, this is merely an example. In other cases, the second term may be computed differently. As an example, the second term may be a photometric error, although this may be less robust than the approach of FIG. 5.

In the example of FIG. 5, the second neural network architecture 150 is configured to predict the second term 152, which combines information from the first and second images. In other examples, the depth estimation engine 140 may be configured to predict at least one further term, e.g. at least one further residual term. For example, the depth estimation engine 140 may be configured to use the second neural network architecture 150 to predict, using the second image data and further image data representative of at least one further image of the scene, at least one further term. The at least one further term may depend on the second image data, the further image data, the second pose of the image capture device during capture of the second image, and at least one further pose of the image capture device during capture of the at least one further image. In this way, information for additional images of the scene, e.g. additional frames of a video, can be incorporated into the determination of vertex depth values (such as vertex depth values for a mesh representation associated with the first image) in a straightforward way. This may improve the accuracy with which the vertex depth values may be determined. For example, with the depth estimation engine 140 according to examples, additional residual terms can be added to the cost function to represent an arbitrary number of frames.

Referring back to FIG. 5, the depth estimation engine 140 includes a cost function estimation engine 154, which is configured to optimise the cost function to estimate the vertex depth values 156 associated with respective vertices of a mesh representation of a scene. In this case, the cost function, $L(x_i)$, includes the first term 148 and the second term 152 and may be expressed as:

$$L(x_i) = \|A(I_i)x + b(I_i)\|^2 + \sum_{u_i} r^2(Y(I_i)[u_i], Y(I_j)[u_j])$$

To estimate the vertex depth values for the vertices of the mesh representation, the cost function may be optimised. The optimisation of the cost function may be performed using any optimisation procedure. For example, the Gauss-Newton algorithm may be used to iteratively find the vertex depth values that minimise the value of the cost function. The damped Gauss-Newton algorithm may be used, with a predetermined number of iterations, such as twenty iterations, to limit computational requirements.

In this case, the vertex depth values estimated are those of the first mesh representation associated with the first image. The first image in this case is captured subsequently to the second image, and vertex depth values for a second mesh representation associated with the second image may have been obtained previously using a similar method.

As explained above, in some cases, the cost function may also depend on the pose of the image capture device, e.g. during capture of the first image. In such cases, the cost function may be optimised to jointly estimated the vertex depth values and the first pose, using a similar approach.

Figure 6:
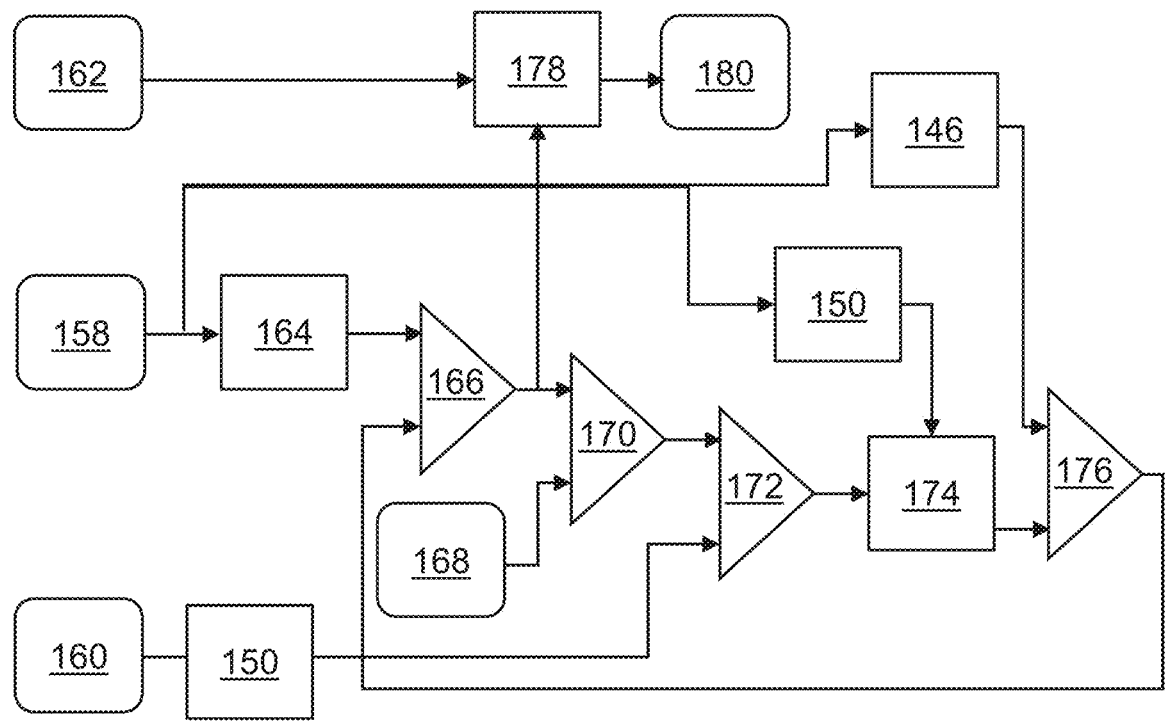
FIG. 6 is a schematic diagram showing the training of the depth estimation engine of FIG. 5.

FIG. 6 is a schematic diagram showing the training of the depth estimation engine of FIG. 5. Features of FIG. 6 which are the same as features of FIG. 5 are labelled with the same reference numerals; corresponding descriptions are to be taken to apply.

First image data 158 and second image data 160 are received. The first and second image data are as described with reference to FIG. 5. In this case, though, the first and second image data form part of a set of training samples from a set of training data, rather than representing a scene for which a mesh representation is to be obtained. A ground-truth depth map 162 is also received, which also forms part of the set of training samples, and in this case is associated with the first image and represents the ground-truth depth of the scene represented by the first image. The first image data 158 is processed by an in-plane position estimation network 164, which is configured to estimate in-plane positions associated with respective vertices of a mesh representation associated with the first image (which may be referred to as a first mesh representation). The in-plane position estimation network 164 may be the same as that described with reference to other examples herein, such as FIGS. 1 to 4.

The in-plane positions output by the in-plane position estimation network 164 are processed by a depth map estimator 166, along with initial estimates of the vertex depth values, to obtain a predicted depth map. The initial estimates of the vertex depth values may be constant values. The depth map estimator 166 for example computes the predicted depth map from the in-plane positions and the initial estimates of the vertex depth values using a transformation function, such as that described with reference to FIG. 4. The transformation function may be obtained once per training sample, after obtaining the output of the neural network architecture, as the output of the neural network architecture remains constant during inference.

The predicted depth map and pose data 168, which in this case represents a relative pose of the image capture device between capture of the first image and capture of the second image, are used by a correspondence estimator 170 to estimate dense correspondence between pixels of the first image and corresponding pixels of the second image. The pose data 168 may be obtained from an external mapping system, e.g. as described with reference to FIG. 7.

The first image data 158 is also processed by the first neural network architecture 146 to compute the first term, p(x), of the cost function. Both the first image data 158 and the second image data 160 are processed by the second neural network architecture 150 to obtain first and second feature data, respectively, which may be represented as $Y(I_i)$ and $Y(I_j)$.

A feature lookup 172 is performed using the dense correspondences output by the correspondence estimator 170 to obtain the second feature data for pixels of the second image which represent the same part of the scene as pixels of the first image. A mapping estimator 174 then uses the first and second feature data to obtain the mapping $r(y_j, y_j)$, which is described above. The mapping estimator 174 may for example include a third neural network architecture for computing weights for use in the generation of the mapping. The output of the mapping estimator 174 may be considered to correspond to the second term of the cost function.

The cost function (which in this case includes the second term and the first term output by the first neural network architecture 146) are processed using a damped Gauss-Newton algorithm 176 to compute an update to the vertex depth values. These updated vertex depth values may be considered to correspond to optimised values of the vertex depth values. As explained above, the Gauss-Newton algorithm may also be used at inference time, after the depth neural network architecture has been trained, to estimate the vertex depth values. In such cases, the number of iterations of the optimisation may be lower in training than at inference time. For example, during training, the Gauss-Newton algorithm 176 may include two or three iterations, to reduce computation. However, at inference time, the Gauss-Newton algorithm may include twenty iterations.

At this stage, the parameter values of the depth neural network architecture (which in this case includes the first and second neural network architectures 146, 150) are fixed. For example, the parameter values may be initialised to predetermined values, e.g. predetermined constant values. Hence, the optimised values of the vertex depth values are for example obtained by optimising the cost function, given fixed values of the parameters of the at least one depth neural network architecture.

The optimised values of the vertex depth values are backpropagated to the depth map estimator 166, which then computes an updated predicted depth map. The updated predicted depth map and the ground-truth depth map are processed using a loss function estimator 178 to obtain a loss function 180. The loss function 180 may be the same as that used in the training of the in-plane position estimation network 164, e.g. as described with reference to FIG. 4. Hence, the training process for example includes obtaining optimised values of the parameters of the depth neural network architecture that optimise a loss function based on a comparison between a predicted depth map obtained using the optimised values of the vertex depth values and a ground-truth depth map. The loss function may use an L1 norm to limit effects arising from very near objects, which can lead to unduly high losses.

The training of the depth neural network architecture typically comprises an iterative process, in which a plurality of training iterations are repeated to optimise the loss function to determine the parameter values for the depth neural network architecture. As explained, the training process may itself be a multi-stage process, involving obtained optimised values of the vertex depth values and then using the optimised values of the vertex depth values to obtain the optimised values of the parameters of the depth neural network architecture. In such cases, obtaining the optimised values of the vertex depth values may include obtaining a respective value of the vertex depth values for each of a plurality of iterations. Obtaining the optimised values of the parameters may further include computing a loss value of the loss function for each of the respective value of the vertex depth values, and computing a combined loss based on the loss values. For example, rather than using the loss value after the vertex depth values have been optimised, the loss values for each iteration may be added together and weighted by the loss value of the previous iteration. This down-weights training examples with objects that are very close to the image capture device, which can disturb the training process.

Figure 7:
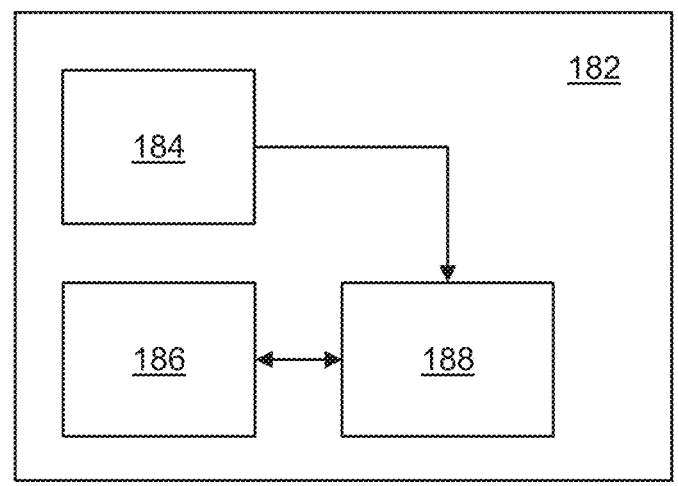
FIG. 7 is a schematic diagram showing components of a robotic device according to examples.

FIG. 7 is a schematic diagram showing components of a robotic device 182 according to an example. The robotic device 182 includes a computing system 184. The computing system 184 may be a single computing device (e.g. a desktop, laptop, mobile and/or embedded computing device) or may be a distributed computing system, which is distributed over multiple discrete computing devices (e.g. certain components may be implemented by one or more server computing devices based on requests from one or more client computing devices made over a network). The computing system 184 includes an image capture device, e.g. a video camera arranged to provide frames of video, which for example include observations of a scene. The image capture device may be statically mounted with respect to the robotic device 182, or moveable with respect to the robotic device 182. The computing system 184 includes an image processing system such as those described herein. The computing system 184 may also include a tracking system arranged to determine poses of the camera during observation of the scene. The computing system 184 may further include a mapping system arranged to populate a map of the scene with maps obtained by the image processing system, such as depth maps obtained from the mesh representation obtained by the image processing system. The tracking and mapping systems may form part of a simultaneous localisation and mapping (SLAM) system. A SLAM system within the field of robotic mapping and navigation acts to construct and update a map of an unknown environment while simultaneously locating a robotic device associated with the map within the environment. For example, the robotic device may be the device that is constructing, updating and/or using the map.

The robotic device 182 also includes one or more actuators 186 to enable the robotic device 182 to interact with a surrounding three-dimensional environment. The actuators 186 may include tracks, burrowing mechanisms, rotors, etc., so that the robotic device 182 can move around or otherwise interact with a 3D space. At least a portion of the surrounding three-dimensional environment may be shown in the scene captured by the image capture device of the computing system 184. In the case of FIG. 7, the robotic device 182 may be configured to capture image data, e.g. in the form of video data, as the robotic device 182 navigates a particular environment. In another case, though, the robotic device 182 may scan an environment, or operate on image data received from a third party, such as a user with a mobile device or another robotic device. As the robotic device 182 processes the image data, it may be arranged to obtain mesh representations of the scene from which depth maps may be derived, e.g. to enable the robotic device 182 to map its environment.

The robotic device 182 also includes an interaction engine 188 including at least one processor to control the one or more actuators 186. The interaction engine 188 of FIG. 7 may be configured to use the mesh representations and/or depth maps obtained by the robotic device 182 to control the robotic device 182 to interact with the surrounding 3D environment. For example, a depth map may be used to identify a position of the object to be grabbed and/or to avoid collisions with barriers such as walls.

Examples of functional components as described herein with reference to FIG. 7 may include dedicated processing electronics and/or may be implemented by way of computer program code executed by a processor of at least one computing device. In certain cases, one or more embedded computing devices may be used. Components as described herein may include at least one processor operating in association with memory to execute computer program code loaded onto a computer readable medium. This medium may include solid state storage such as an erasable programmable read only memory and the computer program code may include firmware. In other cases, the components may include a suitably configured system-on-chip, application-specific integrated circuit and/or one or more suitably programmed field-programmable gate arrays. In one case, the components may be implemented by way of computer program code and/or dedicated processing electronics in a mobile computing device and/or a desktop computing device. In one case, the components may be implemented, as well as or instead of the previous cases, by one or more graphical processing units executing computer program code. In certain cases, the components may be implemented by way of one or more functions implemented in parallel, e.g. on multiple processors and/or cores of a graphics processing unit.

Figure 8:
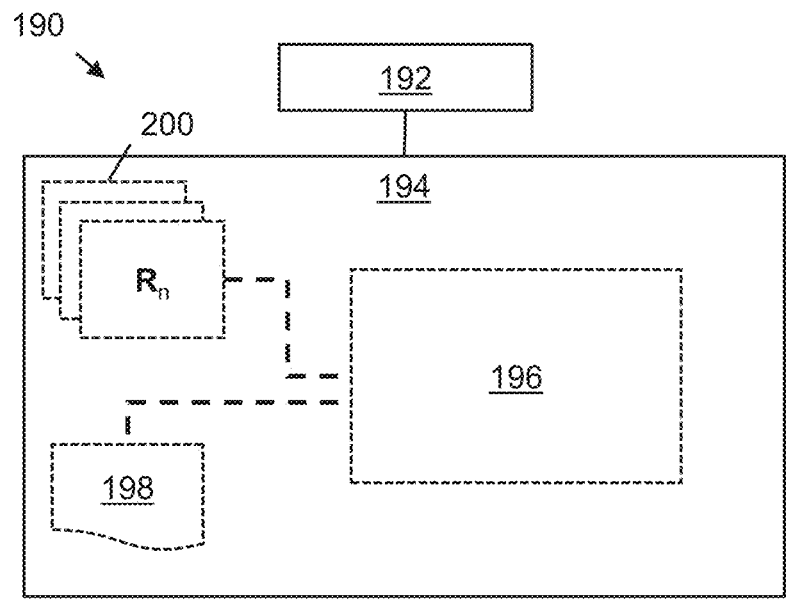
FIG. 8 is a schematic diagram showing a non-transitory computer readable medium according to examples.

FIG. 8 is a schematic diagram showing an example 190 of a processor 192 and a non-transitory computer-readable storage medium 194 comprising computer-executable instructions 196. The computer-executable instructions 196, when executed by the processor 192, cause a computing device, such as a computing device including the processor 192, to obtain a mesh representation of a scene. The instructions may result in a method being performed that is similar to or the same as the example methods described above. For example, the computer-readable storage medium 194 may be arranged to store image data 198 representative of at least one image of the scene. The computer-executable instructions 196, when executed by the processor 192, may be configured to cause a computing device to process the image data 198 to generate a mesh representation 200 of the scene, which may be stored in the computer-readable storage medium 194. Although in FIG. 8, the image data 198 and the mesh representations 200 are shown as being stored on the computer-readable storage medium 194, in other examples, at least one of the image data 198 and the mesh representations 200 may be stored in storage which is external to (but accessible by) the computer-readable storage medium 194.

The above examples are to be understood as illustrative examples. Further examples are envisaged.

Figure 9:
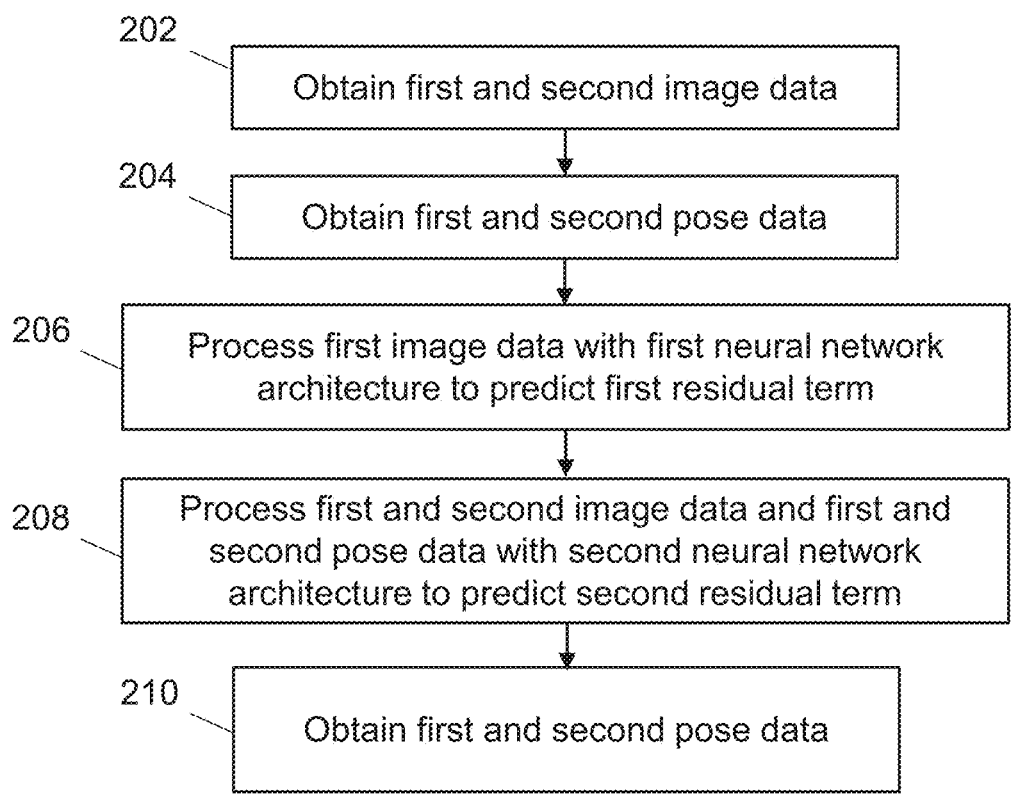
FIG. 9 is a flow diagram showing a method of obtaining a representation of a scene according to examples.

For example, methods and/or systems similar to those described herein may be adapted to obtain a representation of a scene, which may be a mesh representation or another representation, such as a latent representation. FIG. 9 is a flow diagram showing a method of obtaining a representation of a scene according to examples. The method of FIG. 9 may be performed by an image processing system, which may have similar features to the image processing systems described above, and may be used by a robotic device, e.g. to interact with or navigate within an environment. The method of FIG. 9 may, for example, be performed by a representation estimation engine of the image processing system.

At item 202 of FIG. 9, first image data representative of a first image of the scene and second image data representative of a second image of the scene is obtained. The second image at least partly overlaps the first image At item 204 of FIG. 9, first pose data representative of a first pose of an image capture device during capture of the first image and second pose data representative of a second pose of the image capture device during capture of the second image is obtained.

At item 206 of FIG. 9, the first image data is processed with a first neural network architecture to predict a first residual term.

At item 208 of FIG. 9, the first image data, the second image data, the first pose data, and the second pose data are processed with a second neural network architecture to predict a second residual term.

At item 210 of FIG. 9, a cost function is optimised to estimate the representation of the scene. The cost function comprises the first residual term and the second residual term.

The first residual term may represent a prior factor and the second residual term may represent a stereo factor, similarly to the first and second terms of FIG. 5. The first and second neural network architectures may be similar to or the same as those described with reference to FIGS. 5 and 6, but may not rely on the positions of vertices of polygons of a mesh representation, e.g. if the representation is a non-mesh representation. For example, the representation estimation engine may be configured to obtain a latent representation of the scene, and the image processing system may comprise a depth mapping engine configured to transform the latent representation of the scene from a latent space to obtain a depth map of the scene. A latent representation is for example a representation that is inferred from a measurement (e.g. from the first and second images). A latent representation is sometime referred to as a "hidden" set of variable values, as they may not be directly measurable from an environment. Typically, a latent representation is more compact, for example with a lower dimensionality, than a direct measurement. Hence, such latent representations may be processed and stored more efficiently.

In other cases, the representation estimation engine may be configured to obtain a mesh representation of the scene, e.g. as described with reference to FIGS. 5 and 6, wherein the mesh representation comprises a plurality of polygons defined by respective vertices associated with an in-plane position, the in-plane position being in a plane comprising a first dimension and a second dimension, and the vertices having an associated vertex depth value in a third dimension different from the first dimension and the second dimension.

The representation estimation engine may be configured to use the second neural network architecture to process the second image data, further image data representative of at least one further image of the scene, the second pose data and further pose data representative of at least one further pose of the image capture device during capture of the at least one further image, to predict at least one further residual term, and the cost function comprises the at least one further residual term.

The second neural network architecture may be configured to generate first feature data representative of first image features of the first image and second feature data representative of second image features of the second image, and the second residual term may be based on a weighted comparison between the first image features for regions of the first image and the second image features for corresponding regions of the second image. In these cases, the depth estimation engine may be configured to process the first feature data and the second feature data using a third neural network architecture to predict weight data representative of weights for computing the weighted comparison. This may be similar to the weighted comparison described with reference to FIG. 5.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A system configured to obtain a mesh representation of a scene,
   wherein the mesh representation comprises a plurality of polygons defined by respective vertices associated with in-plane positions, the in-plane positions being in a plane comprising a first dimension and a second dimension, and the vertices having an associated vertex depth value in a third dimension different from the first dimension and the second dimension,
   and the system comprises:
       an in-plane position estimation network configured to process image data representative of an image of the scene to estimate the in-plane positions associated with respective vertices of the mesh representation, wherein the in-plane position estimation network comprises a neural network architecture comprising parameters obtained during training using a loss function based on a comparison between a predicted depth map and a ground-truth depth map, wherein the predicted depth map is computed from an output of the neural network architecture during the training; and
       a depth estimation engine configured to process the in-plane positions and the image data to estimate the associated vertex depth values for the respective vertices of the mesh representation.

2. The system according to claim 1, wherein the predicted depth map is computed from the output of the neural network architecture during the training using a transformation function for transforming vertex depth values associated with respective vertices of the mesh representation to pixel depth values associated with respective regions of the scene, wherein the transformation function depends on the output of the neural network architecture.

3. The system according to claim 2, wherein the transformation function is obtained by rendering the predicted depth map.

4. The system according to claim 2, wherein the transformation function (Original) comprises barycentric weights associated with respective polygons of the plurality of polygons.

5. The system according to claim 1, wherein the neural network architecture comprises:
    at least one convolutional layer to detect image features of the image; and
    at least one fully connected layer to process image features for a plurality of patches of the image to estimate the in-plane positions.

6. The system according to claim 1, wherein the associated vertex depth values for the respective vertices of the mesh representation are inverse depth values, the predicted depth map represents predicted inverse depth values associated with respective spatial regions of the scene and the ground-truth depth map represents ground-truth inverse depth values associated with the respective spatial regions.

7. The system according to claim 1, wherein each polygon of the plurality of polygons is a triangle.

8. The system according to claim 1, wherein the in-plane position estimation network is configured to estimate the in-plane positions such that the plurality of polygons satisfy a size condition, wherein optionally the size condition is satisfied by polygons with a length of less than or equal to a predetermined proportion of a length of the image, in at least one of the first and second dimensions.

9. The system according to claim 1, wherein the in-plane position estimation network is configured to estimate the in-plane positions such that the plurality of polygons are non-overlapping.

10. The system according to claim 1, wherein the depth estimation engine is configured to estimate the associated vertex depth values for the respective vertices of the mesh representation by optimising a cost function comprising a term dependent on the image data and the in-plane positions.

11. The system according to claim 1, further comprising:
    one or more actuators for interacting with a surrounding three-dimensional environment, wherein at least a portion of the surrounding three-dimensional environment is shown in the scene; and
    an interaction engine comprising at least one processor to control the one or more actuators.

12. A system configured to obtain a mesh representation of a scene,
    wherein the mesh representation comprises a plurality of polygons defined by respective vertices associated with in-plane positions, the in-plane positions being in a plane comprising a first dimension and a second dimension, and the vertices having an associated depth value in a third dimension different from the first dimension and the second dimension,
    and the system comprises:
        an in-plane position estimation network configured to process image data representative of an image of the scene to estimate the in-plane positions associated with respective vertices of the mesh representation; and
        a depth estimation engine configured to:
            receive the in-plane positions and the image data; and
            optimise a cost function comprising a term dependent on the image data and the in-plane positions, to estimate the associated vertex depth values for the respective vertices of the mesh representation.

13. The system according to claim 12, wherein the image data comprises first image data representative of a first image of the scene and second image data representative of a second image of the scene which at least partly overlaps the first image, the term is a first term, and the cost function comprises a second term dependent on the first image data, the second image data, first pose data representative of a first pose of an image capture device during capture of the first image, and second pose data representative of a second pose of the image capture device during capture of the second image.

14. The system according to claim 13, wherein the depth estimation engine is configured to optimise the cost function to jointly estimate the associated vertex depth values and the first pose of the image capture device.

15. The system according to claim 13, wherein the term is a first term, and the depth estimation engine comprises a depth neural network architecture to predict at least one residual term based on the in-plane positions and the image data, wherein the at least one residual term comprises the first term and depends on the associated vertex depth values, and the cost function comprises the at least one residual term.

16. The system according to claim 15, wherein the depth neural network architecture comprises parameters obtained during a training process comprising:
obtaining optimised values of the vertex depth values that optimise the cost function, given fixed values of the parameters of the depth neural network architecture; and
obtaining optimised values of the parameters that optimise a loss function based on a comparison between a predicted depth map obtained using the optimised values of the vertex depth values and a ground-truth depth map.

17. The system according to claim 16, wherein:
obtaining the optimised values of the vertex depth values comprises obtaining a respective value of the vertex depth values for each of a plurality of iterations; and
obtaining the optimised values of the parameters comprises computing a loss value of the loss function for each of the respective value of the vertex depth values and computing a combined loss based on the loss values.

18. The system according to claim 15, wherein the depth neural network architecture is configured to:
predict, using the in-plane positions, vertex residual terms associated with the respective vertices of the mesh representation; and
obtain a term of the at least one residual term from the vertex residual terms.

19. The system according to claim 15, wherein:
the term is a first term;
the image data comprises first image data representative of a first image of the scene and second image data representative of a second image of the scene which at least partly overlaps the first image; and
the depth neural network architecture comprises:
a first neural network architecture to predict, using the first image data, the first term; and
a second neural network architecture to predict, using the first image data and the second image data, a second term dependent on the first image data, the second image data, a first pose of an image capture device during capture of the first image, and a second pose of the image capture device during capture of the second image.

20. The system according to claim 19, wherein the depth estimation engine is configured to use the second neural network architecture to predict, using the second image data and further image data representative of at least one further image of the scene, at least one further term dependent on the second image data, the further image data, the second pose of the image capture device during capture of the second image, and at least one further pose of the image capture device during capture of the at least one further image.

21. The system according to claim 19, wherein the second neural network architecture is configured to generate first feature data representative of first image features of the first image and second feature data representative of second image features of the second image and the second term is based on a weighted comparison between the first image features for regions of the first image and the second image features for corresponding regions of the second image.

22. The system according to claim 21, wherein the depth neural network architecture comprises a third neural network architecture configured to process the first feature data and the second feature data to obtain weight data representative of weights for computing the weighted comparison.

23. The system according to claim 12, wherein the in-plane position estimation network comprises an in-plane neural network architecture comprising parameters obtained during training using a loss function based on a comparison between a predicted depth map and a ground-truth depth map, wherein the predicted depth map is computed from an output of the in-plane neural network architecture during the training.

24. The system according to claim 12, further comprising:
one or more actuators for interacting with a surrounding three-dimensional environment, wherein at least a portion of the surrounding three-dimensional environment is shown in the scene; and
an interaction engine comprising at least one processor to control the one or more actuators.

25. A method of training an in-plane position estimation network, the method comprising, for a training iteration:
obtaining a set of training samples from a set of training data, wherein each of the training samples comprises image data representative of a scene and a ground-truth depth map of the scene;
for each given training sample in the set of training samples:
processing the image data for the given training sample using a neural network architecture of the in-plane position estimation network to obtain estimated in-plane positions associated with respective vertices of polygons of a mesh representation of the scene, wherein the estimated in-plane positions are in a plane comprising a first dimension and a second dimension;
using the estimated in-plane positions to obtain a predicted depth map of the scene, wherein the predicted depth map comprises depth values associated with the respective vertices in a third dimension different from the first and second dimensions; and
computing a loss function based on a comparison between the predicted depth map and the ground-truth depth map for the given training sample,
wherein the training iteration is repeated to optimise the loss function to determine parameter values for the neural network architecture.

26. The method according to claim 25, comprising:
processing the image data for the given training sample using at least one convolutional layer of the neural network architecture to obtain feature data representative of image features for the given training sample; and processing the feature data for a plurality of image patches of the given training sample, corresponding to regions of the scene associated with respective vertices of the mesh representation with initial in-plane positions, using a fully-connected layer of the neural network architecture to compute a perturbation to the initial in-plane positions to obtain the estimated in-plane positions, wherein, prior to the perturbation, the vertices of the mesh representation are regularly spaced from each other in the plane.

* * * * *